United States Patent [19]
Dowell et al.

[11] Patent Number: 5,456,019
[45] Date of Patent: Oct. 10, 1995

[54] METHOD AND APPARATUS FOR MEASURING A VEHICLE SEAT H-POINT

[75] Inventors: Robert J. Dowell, Pinckney; Joseph A. Hamilton, Westland, both of Mich.

[73] Assignee: Lear Seating Corporation

[21] Appl. No.: 230,477

[22] Filed: Apr. 20, 1994

[51] Int. Cl.6 .................................................. G01B 5/25
[52] U.S. Cl. ............................ 33/600; 33/1 M; 33/555
[58] Field of Search .......................... 33/600, 608, 1 M, 33/1 BB, 503, 533, 645, 549, 555, 511, 512, 515, 572, 573

[56] References Cited

U.S. PATENT DOCUMENTS

| | | | |
|---|---|---|---|
| 3,377,713 | 4/1968 | Schiler | 33/503 |
| 3,566,479 | 3/1971 | Pascoe et al. | 33/503 |
| 4,133,112 | 1/1979 | Matthiessen | 33/1 M |
| 4,266,345 | 5/1981 | Alice et al. | 33/503 |
| 4,507,872 | 4/1985 | Schermann | 33/600 |

FOREIGN PATENT DOCUMENTS

| | | | |
|---|---|---|---|
| 2736145 | 2/1979 | Germany | 33/1 M |
| 142202 | 7/1985 | Japan | 33/1 M |

*Primary Examiner*—Christopher W. Fulton
*Attorney, Agent, or Firm*—Howard & Howard

[57] ABSTRACT

A method and apparatus for measuring the coordinates of a vehicle seat hip pivot axis, or H-point, including a vehicle seat assembly (10) supported on a support structure (30). The support structure (30) having x and z coordinate grid lines and an alignment pick-up bar (82) for aligning the seat (10) along predetermined x and z coordinate grid lines. A seat occupant simulating manikin (32) is positioned on the seat (10) for defining the vehicle seat hip pivot axis. Measuring device (92) for aligning and measuring the hip pivot axis, or H-point, includes a guide (120) fixedly supported at predetermined x,z coordinates on the support structure (30) for guiding a housing member (94) along an x-axis. A telescoping member (96) slidably extends from the housing member (94) along a y-axis and a measuring pointer (108) extends from the telescoping member (96) along a z-axis to align with and measure the hip pivot axis, or H-point, on the manikin.

20 Claims, 3 Drawing Sheets

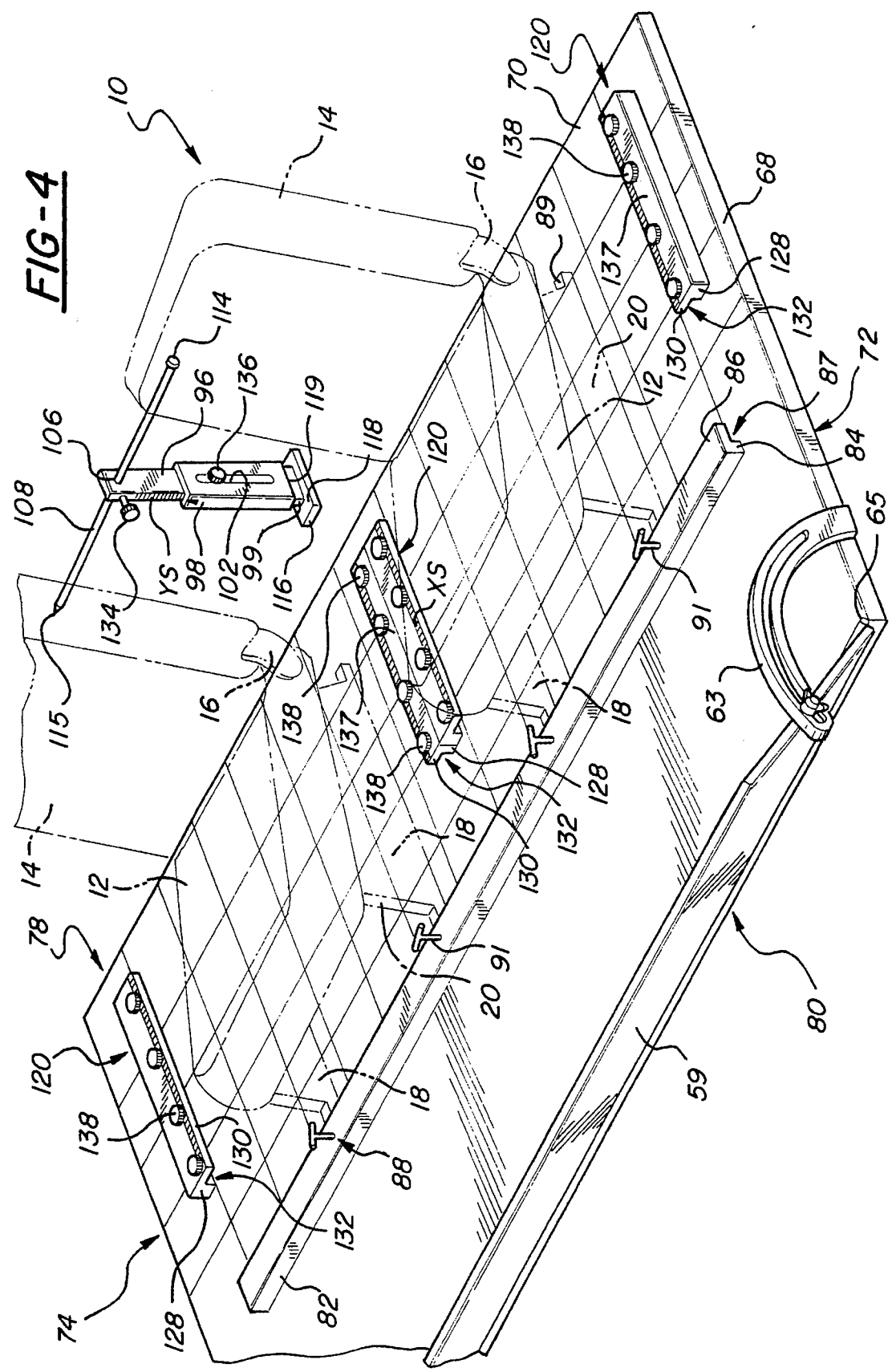

METHOD AND APPARATUS FOR MEASURING A VEHICLE SEAT H-POINT

TECHNICAL FIELD

The subject invention relates to a method and apparatus for measuring a vehicle seat H-point, and more particularly, for measuring the x and y-coordinates of a vehicle seat hip pivot axis.

BACKGROUND ART

A vehicle seat H-point defines the hip pivot point or hip pivot axis of the driver or passenger seated in the vehicle seat at a predetermined fore and aft track adjusted position and seat back angle. The vehicle H-point is required for design of a multitude of interior vehicle components including dash and instrument controls, steering and signal controls, foot pedal controls, etc. Therefore, it is crucial that the vehicle seat design meets the required H-point coordinates.

Generally, the required H-point is given in an x and y-coordinate as dictated by the vehicle manufacturer. The vehicle seat must be designed to meet these predetermined H-point coordinates. Such factors as the vehicle seat tracks and risers, seatback angle, foam stiffness, and seat contour, each play a contributing factor in altering the H-point of the vehicle seat. Therefore, each seat design must be tested and the vehicle seat H-point coordinates measured to determine whether the design, or test, seat H-point corresponds with the predetermined H-point coordinates designated by the vehicle manufacturer.

Referring to FIGS. 1 and 2, the prior art method and apparatus for locating and measuring the vehicle seat H-point, as generally known in the vehicle seat manufacturing industry and as currently practiced by the applicant, is shown. FIG. 1 discloses a vehicle seat mounted to a seat riser and supported on a support platform commonly referred to as a buck or throne. The support platform includes an adjustable heel support plate and an alignment pickup bar. The heel support plate pivots about a pivot point on the support platform indicated as the heel point or "HP". The pickup bar is spaced at a predetermined distance from the heel point and the riser of the vehicle seat is firmly abutted against the pickup bar. A seat occupant simulator or manikin is seated on the vehicle seat. The manikin includes a pair of legs and feet which are supported on the heel support plate, a lower trunk portion supported on the vehicle seat, and an upper torso portion pivotally connected to the lower trunk portion by a pivot simulating the seat occupant's hip joint, and therefore, defining the vehicle seat hip pivot axis, or H-point.

The prior art apparatus utilized to locate and measure the vehicle seat H-point is generally indicated at 200 in FIGS. 1 and 2. The apparatus 200 is a generally U-shaped member having a main beam 202 with a leveling indicator 204 positioned in the center thereof. The apparatus 200 includes a reference beam 206 coupled by any suitable bracket to one end of the main beam 202, and a locator beam 208 coupled by a similar bracket to the opposite end of the main beam 202.

In use, the measuring apparatus 200 is positioned so that the distal end of the reference beam 206 is aligned with the center of the pickup bar on the support platform. The distal end of the locator beam 208 includes an aperture 210 for alignment with the hip pivot axis of the vehicle seat manikin. Once the beams 206, 208 are properly positioned, the main beam 202 is leveled and the brackets are tightened to secure the measuring apparatus 200 in a fixed position. The measuring apparatus 200 may then be removed from the vehicle seat and positioned on a scaled drawing sheet as shown in FIG. 2. The drawing sheet includes coordinate lines in the x and y direction which correspond to coordinate grid lines on the support structure of FIG. 1. An image of the vehicle seat is indicated on the drawing as well as the predetermined heel point and pickup bar point taken from the support structure. The predetermined vehicle manufacturer H-point having an x and y-coordinate is marked at its proper location on the drawing as indicated at H-PT. The measuring apparatus 200 is placed on the drawing with the distal end of the reference beam 206 placed on the pickup bar point. A common draftsman's triangle is used to level the apparatus 200 in relation to a coordinate line on the drawing and the design, or test, seat H-point is marked through the aperture 210 on the indicator beam 208. Finally, if the H-point of the test seat is within a generally one-inch tolerance of the required predetermined H-point, then the test seat meets the manufacturer requirements and may proceed to production.

As can be appreciated, the measuring apparatus requires several adjustments, leveling, and tedious placement on the drawing sheet in order to identify the vehicle test seat H-point coordinates. Therefore, it is desirable to provide a method and apparatus for measuring the coordinates of the vehicle seat hip pivot axis while in position and secured on the support platform.

Various apparatuses have been developed for measuring different contours and points of a work piece via x, z and y-axes. For example, the U.S. Pat. No. 4,133,112 to Matthiessen discloses an apparatus for measuring a work piece including a rectangular support frame having a guide rail with the measuring scale extending the entire length of the support frame. A guide carriage carrying a measuring device is received on the guide rail. The measuring device includes a column inserted in the guide cartridge and a receiving part wherein a measuring rod is disposed to be longitudinally displaceable. A measuring feeler is mounted at the distal end of the measuring rod to locate and measure a work piece. However, the measuring apparatus and system does not provide a support structure for supporting a vehicle seat and including x, z and y-coordinate axes to locate and measure the coordinates of a vehicle seat hip pivot axis.

SUMMARY OF THE INVENTION

An apparatus for measuring the coordinates of a vehicle seat hip pivot axis comprising support means for supporting the vehicle seat, the support means having a plurality of parallel z-coordinate grid lines extending longitudinally between first and second ends of the support means and a plurality of parallel x-coordinate grid lines extending perpendicular to the z-coordinate grid lines between forward and rearward ends of the support means. An alignment means is operatively connected to the support means for aligning the vehicle seat at a predetermined position along the x-coordinate and z-coordinate grid lines on the support means and securing means for fixedly securing the vehicle seat in the predetermined position on the support means. Measuring means is provided for measuring the coordinates of the vehicle seat hip pivot axis, the measuring means includes housing means for housing a telescoping member extendable from the housing means and movable along a y-axis perpendicular to each of the x-coordinate and z-coordinate grid lines and further including a measuring pointer slidably coupled to the telescoping member and movable along a z-axis parallel with the z-coordinate grid lines. Finally, a guide means is operatively connected to the support means and extends longitudinally along a predetermined x-coordinate grid line having first and second ends extending between spaced apart predetermined z-coordinate grid lines defining an x-axis for guiding the measuring means along the x-axis to align with and measure the coordinates of the vehicle seat hip pivot axis.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a partially exploded, fragmentary perspective view of the vehicle seat assembly in various positions on the support structure including the subject invention measuring apparatus for locating and measuring the coordinates of the vehicle seat hip pivot axis.

DETAILED DESCRIPTION OF THE SUBJECT INVENTION

Figure 1:
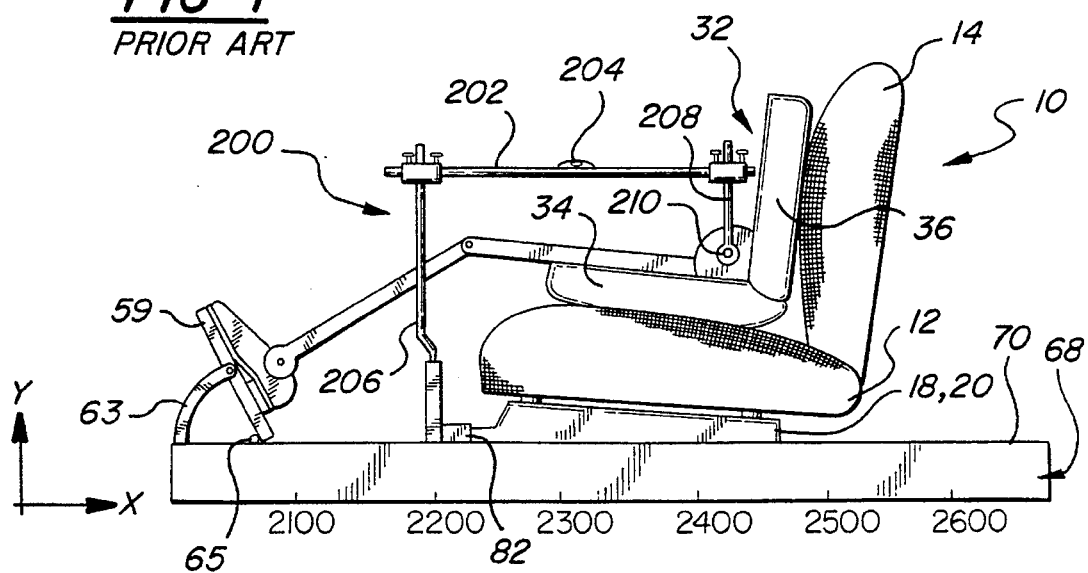
FIG. 1 is a side view of the vehicle seat assembly mounted on a support structure utilizing the prior art H-point measuring apparatus.
Figure 2:
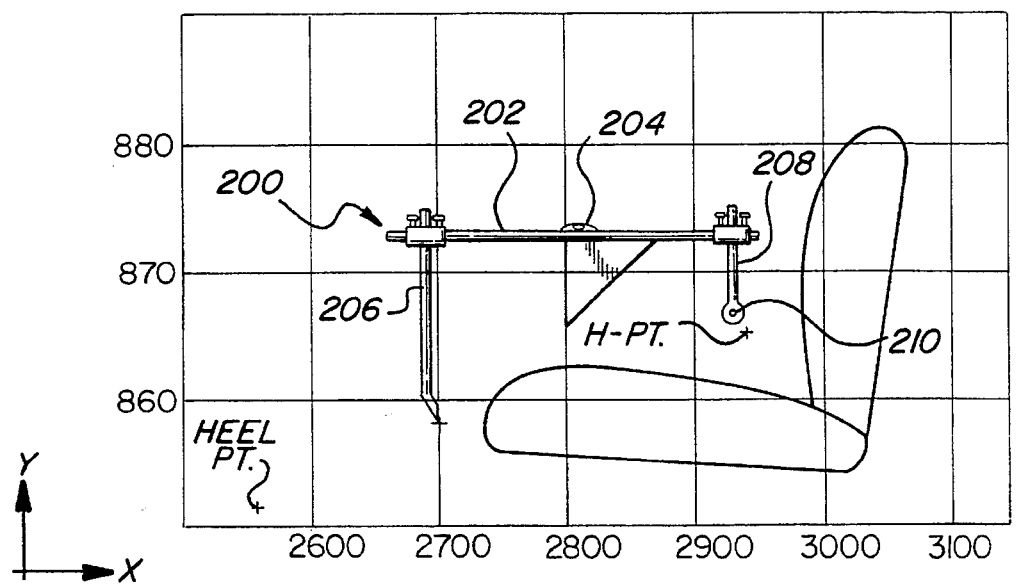
FIG. 2 is a top view of a vehicle seat drawing utilizing the prior art H-point measuring apparatus to identify the test seat H-point.

Referring to the Figures wherein like numerals indicate like or corresponding parts throughout the several views, a vehicle seat assembly is generally shown at 10. The vehicle seat assembly 10 includes a generally horizontal seat portion 12 and a generally vertical or upright backrest portion 14. The seat portion 12 and backrest portion 14 typically include a seat support frame of wire and spring construction encompassed in a poly-foam padding and then cover with an upholstery material (not shown). The backrest portion 14 includes a hinge 16 pivotally connected to the seat portion 12 as is commonly known in the art. The vehicle seat assembly 10 further includes a pair of seat risers 18, 20 mounted to the bottom of the seat portion 12. The seat risers 18, 20 are used to substitute the normal adjustable seat tracks and risers which are mounted to the vehicle floor pan (not shown) thus simulating left 18 and right 20 vehicle seat track and riser assemblies. Each of the seat risers 18, 20 include forward 22 and rearward 24 extension arms, with each of the extension arms 22, 24 including an aperture or bore 26 therethrough. The vehicle seat assembly 10 is securely supported on a support structure generally indicated at 68 as will be further described hereinbelow.

Figure 3:
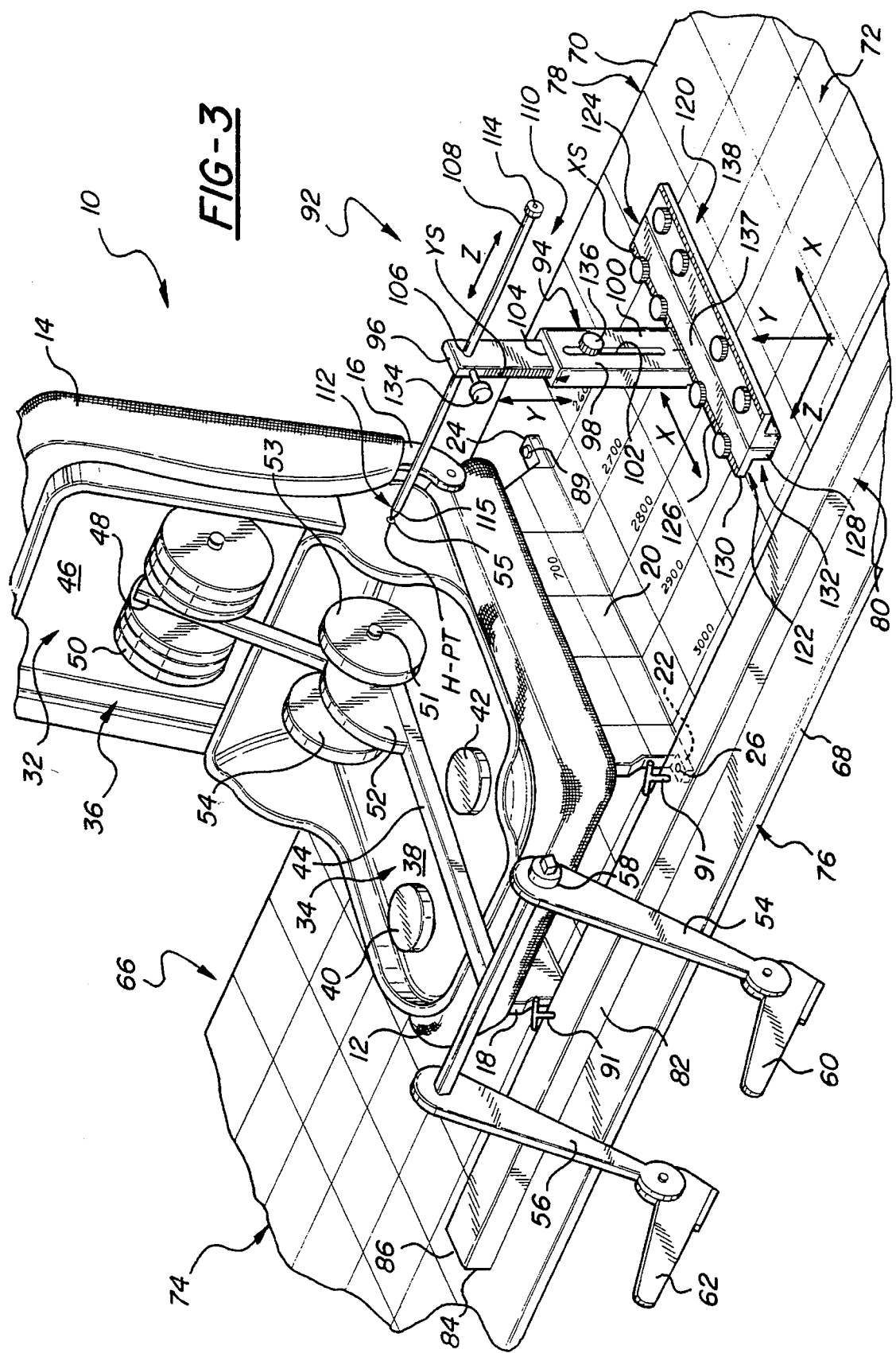
FIG. 3 is a fragmentary perspective view of the vehicle seat assembly mounted on a support structure including the subject invention measuring apparatus for locating and measuring the coordinates of the vehicle seat hip pivot axis.

Referring to FIGS. 3 and 4, seat occupant simulation means, generally indicated at 32, is supported on the vehicle seat assembly 10 for simulating a vehicle seat occupant and establishing the vehicle seat hip pivot axis. The seat occupant simulation means 32 includes an adjustable seat occupant manikin having a lower trunk portion 34 supported on the seat portion 12 and an upper torso portion 36 pressed firmly against the backrest portion 14. The lower trunk portion 34 includes a molded polymeric lower shell 38 having a pair of weights 40, 42 fixedly supported thereon and an elongated, T-shaped lower trunk support bar 44 mounted by rivets or other suitable fasteners to the shell 38. The upper torso portion 36 similarly includes a molded polymeric upper shell 46 and an elongated rectangular upper torso support bar 48 mounted to the shell 46 by rivets or other like fasteners. The upper shell 46 and upper torso support bar 48 also support a plurality of disc-shaped weights indicated at 50. The adjacent ends of the lower trunk support bar 44 and upper torso support bar 48 are interconnected by a hip pivot 51 defining the vehicle seat hip pivot axis as indicated and abbreviated as "H-axis". The hip pivot axis extends through the center of plates 53 to align with a disc-like marker 55 having a cross-hair center point on the outer side wall of the lower shell 38 to define the vehicle seat H-point as "H-PT".

A gauge 52 is mounted between the lower trunk support bar 44 and the upper torso support bar 48 for measuring and indicating the back rest angle of the manikin 32 and vehicle seat assembly 10. Further, a pair of manikin legs 54, 56 are mounted on opposite ends of the T-shaped trunk support bar 44 by a pivotal coupling 58. Still further, manikin feet 60, 62 are additionally pivotally coupled to the ends of the manikin legs 54, 56, respectively. The manikin 32 is designed to represent a 95% human being at the average weight of approximately 167 pounds (lbs.).

The subject invention relates to an apparatus for measuring the coordinates of the vehicle seat hip pivot axis or H-point indicated at 55, and as abbreviated as "H-PT", comprising support means 66 for supporting the vehicle seat assembly 10. The support means 66 includes a generally rectangular support structure or platform 68, commonly referred to as a buck or throne, having an upper support surface 70. The upper support surface 70 includes a plurality of parallel z-coordinate grid lines etched into the upper support surface 70 and extending longitudinally between first 72 and second 74 ends of the support platform 68. The support platform 68 further includes a plurality of x-coordinate grid lines etched into the upper support surface 70 and extending perpendicular to the z-coordinate grid lines between forward 76 and rearward 78 ends of the support platform 68. The x-coordinate and z-coordinate grid lines form a predetermined x and z-coordinate measuring scale generally in metric millimeter dimensions.

Alignment means 80 is operatively connected to the support means 66 for aligning the vehicle seat assembly 10 at a predetermined position along the x-coordinate and z-coordinate grid lines on the support platform 68. The alignment means 80 includes an L-shaped brace member 82, commonly referred to as the pick-up bar, fixedly secure to the upper surface 70 of the support platform 68 by means of bolts or other fasteners, and extending longitudinally along a predetermined z-coordinate grid line between the first 72 and second 74 ends of the support platform 68. The L-shaped brace member 82 further includes an upright leg portion 84 fixedly secured and extending upwardly from the support surface 70 and a generally horizontal leg portion 86 extending outwardly from the upright leg portion 84 toward the rearward end 78 of the support platform 68. The horizontal leg portion 86 is spaced vertically above the upper surface 70 of the support platform 68 providing an alignment channel 87 between the lower surface of the leg portion 86 and the upper surface 70 of the support platform 68. The vehicle seat track risers 18, 20 are supported on the upper surface 70 of the support platform 68. The forward extension arms 22 of each seat track riser 18, 20 are received under the horizontal leg portion 86 of the brace member 82 into the alignment channel 87. The front surface of the horizontal leg portion 86 abuts against the forward edge or rail of the seat track risers 18, 20 to align the vehicle seat assembly 10 along the predetermined z-coordinate grid lines on the support platform 68.

Additionally, securing means 88 are provided for fixedly securing the vehicle seat assembly 10 in the predetermined position on the support platform 68. The securing means 88 include a pair of pins, bolts, or the like, 89 which are received through the apertures 26 in the rearward extension arms 22, 24 of each seat track risers 18, 20 and through a corresponding pair of apertures (not shown) in the upper surface 70 of the support platform 68. The horizontal leg portion 86 of the brace member 82 further includes a pair of apertures or bores (not shown) therethrough for receiving a similar set of pins or bolts, herein shown as T-pins 91, to be received through the apertures 26 in the forward extension arms 22, 24 thus aligning the vehicle seat assembly 10 along the predetermined x and z coordinate grid lines and securing the seat 10 on the support platform 68.

The apparatus further includes measuring means 92 for measuring the coordinates of the vehicle seat hip pivot axis. The measuring means 92 includes housing means 94 for housing a telescoping member 96 extendable from the housing means 94 and moveable along a y-axis perpendicular to each of the x-coordinate and z-coordinate grid lines.

The housing means 94 includes a generally rectangular elongated housing member 98 extending longitudinally along the y-axis. The housing member 98 includes a front face 100 having an elongated channel 102 extending the length of the housing member 98. The housing member 98 further includes a rectangular or U-shaped channel 104 opposite the front face 100 extending the length of the housing member 98 for slidably receiving the telescoping member 96 and providing movement along the y-axis. The telescoping member 96 includes an elongated rectangular bar slidably received in the U-shaped channel 104 for telescoping sliding movement from the housing member 98. The telescoping member 96 includes an aperture 106 along the upper end thereof for slidably receiving a measuring pointer 108 therethrough.

The measuring pointer 108 includes a cylindrical rod having first 110 and second 112 ends. The first end 110 of the measuring pointer 108 includes a disk-shaped stopper 114 having a diameter slightly larger than the diameter of the cylindrical rod to prevent the rod 108 from slidably passing through the aperture 106 in the telescoping member 96. The second end 112 includes a tapered conical pointer 115 to align with the vehicle seat hip pivot axis.

The measuring means 92 further includes a generally rectangular base member 116 slidably supported on the upper surface 70 of the support platform 68. The base member 116 includes an upper surface 118 for supporting the housing means 94 thereon. The housing member 98 is fixedly secured in the center portion of the upper surface 118 of the base member 116 forming a T-shaped member. The general width of the housing member 98 is smaller than the width of the upper surface 118 of the base member 116, therefore leaving an exposed upper surface 118 on each opposing side of the housing member 98. As shown in FIG. 4, the lower portion of the housing member 98 includes a notched section 99 of small rectangular width forming a lip 119 as will be further described hereinbelow.

Finally, the apparatus for measuring the coordinates of the vehicle seat hip pivot axis further includes guide means 120 operatively connected to the support means 66 extending longitudinally along a predetermined x-coordinate grid line and having first 122 and second 124 ends extending between spaced apart predetermined z-coordinate grid lines defining an x-axis for guiding the measuring means 92 along the x-axis to align with and measure the coordinates of the vehicle seat hip pivot axis. The guide means 120 includes at least one L-shaped track member 126 having an upright leg 128 fixedly mounted to the upper surface 70 of the support platform 68 by bolts, fasteners or the like. The track member 126 further includes a generally horizontal leg 130 extending outwardly from the upright leg 128 and spaced above the upper surface 70 of the support platform 68 providing a guide track 132 between the horizontal leg 130 and the upper surface 70 for receivably guiding the measuring means 92 along the x-axis on the support means 66.

More specifically, the base member 116 is slidably received in the guide track 132 and moveable along the x-axis on the upper surface 70 of the support platform 68. Further, the front face of the lower notched section 99 of the housing member 98 remains in sliding contact with the edge of the horizontal leg 130 of the L-shaped track member 126 and lip 119 slidably engauges the upper surface 137 of the leg 130 upon movement of the measuring means 92 along the x-axis.

The apparatus also includes locking means 134 for securely locking the measuring means 92 in the aligned position with the vehicle seat hip pivot axis. Specifically, with respect to the telescoping member 96, the locking means includes a threaded screw 134 received in the side of the telescoping member 96 for passing through the aperture 106 and pressing against the measuring pointer 108 to prevent further movement along the z-axis. Similarly, the telescoping member 96 has a threaded screw 136 extending outwardly therefrom through the elongated channel 102 in the front face 100 of the housing member 98. The screw 136 has a disk-shaped locking nut which when tightened clamps the telescoping member 96 and housing member 98 together to prevent further movement along the y-axis. Finally, the L-shaped track member 126 includes an upper surface 137 having a plurality of threaded screw 138 extending therethrough into the guide track 132. The threaded screws 138 may be tightened against the upper surface 118 of the base member 116 to prevent further movement of the measuring means 92 along the guide track 132 along the x-axis.

In operation, the vehicle seat assembly 10 is supported on the support platform 68 with the seat track risers 18, 20 receivably supported on the upper surface 70. The seat assembly 10 is positioned toward the forward end 76 of the support platform 68 until the forward extension arms 22 of the risers 18, 20 are received in the channel 82 of the L-shaped brace member 82 abutting against the front surface of the horizontal leg portion 86. The seat assembly 10 is then aligned along the x-coordinate grid lines to align with the apertures on the support platform 68 to receive the securing pins 88,91 and fixedly secure the vehicle seat 10 along the predetermined x-coordinate and z-coordinate grid lines on the support platform 68. Also, as shown in FIG. 3, the seat risers 18, 20 include grid lines for corresponding alignment with the x,z coordinate grid lines on the platform 68. Next, as is commonly known and practiced in the prior art seat manufacturing and testing, the seat occupant simulation manikin 32 is positioned on the vehicle seat assembly 10. The plurality of weights 40, 42 and 50 are positioned on the lower trunk portion 34 and upper torso portion 36 to provide for the 95th percentile human being at approximately 167 pounds. The legs 54, 56 and feet 60, 62 are positioned on the trunk bar 44 with the legs 54, 56 set at a predetermined angle with respect to the lower trunk 34. The feet 60, 62 are supported on a foot support plate 59 which is pivotally supported on the support platform 68 by an arcuate support bracket 63 and heel pivot 65 and adjusted to a predetermined foot angle. The upper torso portion 36 is adjusted to the predetermined back rest angle as indicated by the gauge 52.

The L-shaped track member 126 of the guide means 120 is fixedly mounted on the upper surface 70 of the support platform 68 along a predetermined x-coordinate grid line and between predetermined spaced apart z-coordinate grid lines on either the inboard or outboard adjacent side of the vehicle seat assembly 10. The measuring means 92 is slidably supported on the upper surface 70 with the base member 116 slidably received in the guide track 132 and the front face of the housing member 98 abutted against the horizontal leg 130 of the L-shaped track member 126.

To align the measuring means 92 with the vehicle seat hip pivot axis, the housing member 98 and base member 116 are moved along the guide track 132 in the x direction. Secondly, the telescoping member 96 is slidably telescoped in the U-shaped channel 104 of the housing member 98 in the y direction and the measuring pointer 108 is moved through the aperture 106 in the z direction until the conical pointer 114 aligns with the cross hairs of the disc plate 55 identifying the H-point or vehicle seat hip pivot axis on the outer surface of the lower trunk portion 34 of the seat occupant simulation manikin 32. With the measuring means 92 properly aligned, each of the screws 134, 136, 138 of the locking means 134 are tightened to secure each of the measuring pointer 108, telescoping member 96, and housing member 98 in the aligned position with respect to the x-coordinate and z-coordinate grid lines of the support platform 68. The z-coordinate is indicated by the positioning of the seat assembly and seat track risers 18, 20 along the predetermined z-coordinate grid lines on the support platform 68. The x-coordinate is determined by the alignment of the housing member 98 with an x-coordinate scale indicated at "xs" on the upper surface of the L-shaped track member 126. Finally, the y-coordinate is determined by the reading of the upper surface of the housing member 98 along a y-coordinate scale indicated on "ys" on the edge of the telescoping member 96. As shown in FIG. 4, the guide means 120 including the L-shaped track member 126 may be fixedly secured on the inboard or outboard side of either a passenger seat or driver seat for measuring the vehicle seat h-point. As shown, the base member 116 and housing member 98 may be slidably received by each of the guide means 120 at various predetermined position on the support platform 68 for locating the measuring pointer 108 and measuring the H-point on either the inboard or outboard side of the seat 10.

Finally, the x, y and z-coordinates of the vehicle seat assembly 10 as determined by the alignment of the measuring means 92 with the vehicle seat hip pivot axis, are compared with the predetermined coordinates dictated by the vehicle manufacturer. If the test coordinates are within the required tolerance, for example one inch, of the predetermined required coordinates by the vehicle manufacturer, the vehicle seat hip pivot point is acceptable and the seat may proceed towards production.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus for measuring the coordinates of a vehicle seat hip pivot axis comprising:

support means (66) for supporting a vehicle seat (10), said support means (66) having a plurality of parallel z-coordinate grid lines extending longitudinally between first (72) and second (74) ends of said support means (66) and a plurality of parallel x-coordinate grid lines extending perpendicular to said z-coordinate grid lines between forward (76) and rearward (78) ends of said support means (66);

alignment means (80) fixedly connected to said supported means (66) adjacent to said forward end (76) of said support means (66) for aligning the vehicle seat (10) at a predetermined position along said x-coordinate grid lines on said support means (66);

securing means (88) for fixedly securing the vehicle seat (10) at a predetermined position along said z-coordinate grid lines on said support means (66);

measuring means (92) for measuring the coordinates of the vehicle seat hip pivot axis, said measuring means (92) including housing means (94) for housing a telescoping member (96) telescopically slidable along a generally vertical y-axis perpendicular to each of said x-coordinate and z-coordinate grid lines, and a measuring pointer (108) slidably coupled to said telescoping member (96) and moveable along a z-axis parallel with said z-coordinate grid lines to align with the vehicle seat hip pivot axis;

and guide means (120) extending longitudinally along a predetermined x-coordinate grid line and having first (122) and second (124) ends fixedly connected to said support means (66) and extending between spaced apart predetermined z-coordinate grid lines defining an x-axis adjacent to and spaced from at least one side of said predetermined seat position defined by said securing means (88) for guiding said measuring means (92) adjacent to the side of said predetermined seat position along said x-axis to align with and measure the coordinates of the vehicle seat hip pivot axis.

2. An apparatus as set forth in claim 1 further characterized by said alignment means (80) including an L-shaped brace member (82) fixedly secured to said support means (66) and extending longitudinally along said z-coordinate grid lines between said first (72) and second (74) ends of said support means (66).

3. An apparatus as set forth in claim 2 further characterized by said guide means (120) including at least one L-shaped track member (126) having an upright leg (128) extending between said first (122) and second (124) ends and fixedly mounted to said support means (66) and a generally horizontal leg (130) extending from said upright leg (128) toward said predetermined seat position defined by said securing means (88) and spaced above said support means (66) providing a continuous guide track (132) defined between said upright leg (128), said horizontal leg (130) and said support means (66) for receivably guiding said measuring means (92) along said x-axis on said support means (66).

4. An apparatus as set forth in claim 3 further characterized by said measuring means (92) including a base member (116) slidably received in said guide track (132) and moveable along said x-axis on said support means (66).

5. An apparatus as set forth in claim 4 further characterized by said housing means (94) including a housing member (98) fixedly supported on said base member (116) and having a front face (100) in sliding contact with said horizontal leg (130) of said track member (126).

6. An apparatus as set forth in claim 5 further characterized by said housing member (98) having a U-shaped channel (104) for slidably receiving said telescoping member (96) and providing movement along said y-axis.

7. An apparatus as set forth in claim 6 further characterized by said telescoping member (96) including an aperture (106) for slidably receiving said measuring pointer (108) therethrough.

8. An apparatus as set forth in claim 7 further characterized by said measuring pointer (108) including a cylindrical rod having first (110) and second (112) ends, said first end (110) including a stopper (114) to prevent said rod from passing through said aperture (106) in said telescoping member (96) and said second end (112) including a tapered conical pointer (115) to align with the vehicle seat hip pivot axis.

9. An apparatus as set forth in claim 8 further characterized by including locking means (134) for securely locking said measuring means (92) in said aligned position with the vehicle seat hip pivot axis.

10. An apparatus as set forth in claim 9 further characterized by said support means (66) including a support platform (68) having an upper support surface (70), said x-coordinate and said z-coordinate grid lines etched into said upper support surface (70) forming a predetermined x, z-coordinate measuring scale.

11. An apparatus as set forth in claim 10 further characterized by said L-shaped brace member (82) including an upright leg platform (84) fixedly secured to said support platform (68) and a generally horizontal leg portion (86) extending from said upright leg portion (84) and spaced above said support platform (68) providing an alignment channel (87) therebetween.

12. An apparatus as set forth in claim 11 further characterized by including a vehicle seat (10), said seat (10) including a generally horizontal seat portion (12) and a generally upright backrest portion (14) pivotally coupled to said seat portion (12).

13. An apparatus as set forth in claim 12 further characterized by including a seat track riser (18, 20) operatively connected to said seat portion (12) and receivably supported on said support means (66).

14. An apparatus as set forth in claim 13 further characterized by said seat track riser (18, 20) including forward (22) and rearward (24) extended arms, said forward extended arms (22) received in said alignment channel (87) for aligning said vehicle seat (10) in said predetermined x, z-coordinate position on said support means (66).

15. An apparatus as set forth in claim 14 further characterized by said seat track riser arms (22, 24) including apertures (26) therethrough and said securing means (88) including a plurality of pins (89, 91) received through said apertures (26) and into said support platform (68) to secure said vehicle seat (10) in said predetermined position.

16. An apparatus as set forth in claim 15 further characterized by including simulation means (32) supported on said vehicle seat (10) for simulating a vehicle seat occupant and establishing the vehicle seat hip pivot axis.

17. An apparatus as set forth in claim 16 further characterized by said simulation means (32) including an adjustable seat occupant manikin having a lower trunk portion (34) and an upper torso portion (36), said trunk portion (34) and said torso portion (36) connected by a hip pivot (51) defining a vehicle seat hip pivot axis.

18. A method of measuring the coordinates of a vehicle seat hip pivot axis including the steps of:

supporting a vehicle seat (10) on a support structure (68) having a plurality of x-coordinate and z-coordinate grid lines;

aligning the vehicle seat (10) on the support structure (68) at a predetermined position along the x-coordinate grid lines;

securing the vehicle seat (10) at a predetermined position along the z-coordinate grid lines on the support structure (68);

manipulating a seat occupant simulator (32) on the vehicle seat (10) to establish a vehicle seat hip pivot axis;

positioning and securing a guide member (120) at a predetermined x-coordinate and z-coordinate position adjacent to and spaced from at least one side of the predetermined z-coordinate seat position on the support structure (68);

establishing an x-axis parallel with the x-coordinate grid lines, a z-axis parallel with the z-coordinate grid lines and a y-axis perpendicular to each of the x and z-coordinate grid lines;

adjusting a measuring apparatus (92) along each x, z and y-axis to align with and measure the vehicle seat hip pivot axis;

said adjusting of the measuring apparatus (92) including;

sliding a housing member (98) adjacent and parallel to the side of the predetermined z-coordinate seat position on the support structure (68) and against the guide member (120) to align the measuring apparatus (92) with the vehicle seat hip pivot axis along the x-axis;

extending a telescoping member (96) from the housing member (98) along the y-axis;

extending a measuring pointer (18) from the telescoping member (96) along the z-axis from a position spaced outwardly from the side of the predetermined z-coordinate seat position to a position immediate adjacent the vehicle seat (10) to align the pointer (108) with the vehicle seat hip pivot axis; and reading the x-coordinate and y-coordinate of the vehicle hip pivot axis from the x and y-coordinate grid lines.

19. The method as set forth in claim 18 further characterized by locking the measuring apparatus (92) in the aligned position with the vehicle seat hip pivot axis.

20. An apparatus for measuring the coordinates of a vehicle seat hip pivot axis comprising:

support means (66) for supporting a vehicle seat (10), said support means (66) having a plurality of parallel z-coordinate grid lines extending longitudinally between first (72) and second (74) ends of said support means (66) and a plurality of parallel x-coordinate grid lines extending perpendicular to said z-coordinate grid lines between forward (76) and rearward (78) ends of said support means (66);

alignment means (80) fixedly connected to said support means (66) adjacent to and spaced between said forward end (76) of said support means (66) and the vehicle seat (10) for aligning the vehicle seat (10) at a predetermined position along said x-coordinate grid lines on said support means (66);

securing means (88) for fixedly securing the vehicle seat

(10) in at least one predetermined position along said z-coordinate grid lines on said support means (66);

measuring means (92) for measuring the coordinates of the vehicle seat hip pivot axis, said measuring means (92) including housing means (94) for housing a telescoping member (96) telescopically slidable along a generally vertical y-axis, perpendicular to each of said x-coordinate and z-coordinate grid lines, and a measuring pointer (108) slidably coupled to said telescoping member (96) and moveable along a z-axis parallel with said z-coordinate grid lines to align with the vehicle seat hip pivot axis; and guide means (120) extending longitudinally along a predetermined x-coordinate grid line and having first (122) and second (124) ends fixedly connected to said support means (66) and extending between spaced apart predetermined z-coordinate grid lines defining an x-axis, said guide means (120) positioned adjacent to and spaced from opposite sides of said predetermined seat position defined by said securing means (88) of the vehicle seat (10) for guiding said measuring means (92) adjacent to one of said opposing sides of said predetermined seat position along said x-axis to align with and measure the coordinates of the vehicle seat hip pivot axis on either of said opposing sides.

* * * * *